United States Patent [19]
Bernardi

[11] 3,744,433
[45] July 10, 1973

[54] APPARATUS FOR MOVING A VEHICLE ALONG A PATH OF TRAVEL

[75] Inventor: Donald A. Bernardi, Camp Hill, Pa.

[73] Assignee: Bernardi Bros., Inc., Harrisburg, Pa.

[22] Filed: June 30, 1971

[21] Appl. No.: 158,365

[52] U.S. Cl. .......................................... 104/172 B
[51] Int. Cl. ... B65g 17/38, B61b 13/12, B65g 19/00
[58] Field of Search ................... 104/172 B; 198/171

[56] References Cited
UNITED STATES PATENTS

| | | | |
|---|---|---|---|
| 3,196,806 | 7/1965 | Brunder | 104/172 B |
| 3,596,606 | 8/1971 | Smith, Jr. et al. | 104/172 B |
| 3,554,132 | 1/1971 | Hanna | 104/172 B |
| 3,511,187 | 5/1970 | Hanna | 104/172 B |
| 3,408,951 | 11/1968 | Heinicke et al. | 104/172 B |
| 3,233,557 | 2/1966 | Rickel | 104/172 B |

*Primary Examiner*—Drayton E. Hoffman
*Attorney*—Brenner, O'Brien & Guay

[57] ABSTRACT

Apparatus for moving a vehicle along a path of travel such as through a washing installation includes an endless horizontally disposed drive chain having a return path outside of the path of travel of the vehicle, a plurality of on-demand roller assemblies for selectively engaging a wheel of the vehicle, a drive motor for the chain, a self-lubrication assembly, staggered load-bearing surfaces for supporting the roller assemblies regardless of the degree of wear adjustment to the apparatus, and a unitary slack take-up and drive assembly, and wherein the apparatus is surface-mounted for convenient installation, access and maintenance.

18 Claims, 14 Drawing Figures

INVENTOR,

Donald A. Bernardi

BY Brennan, O'Brien & Gray

ATTORNEYS

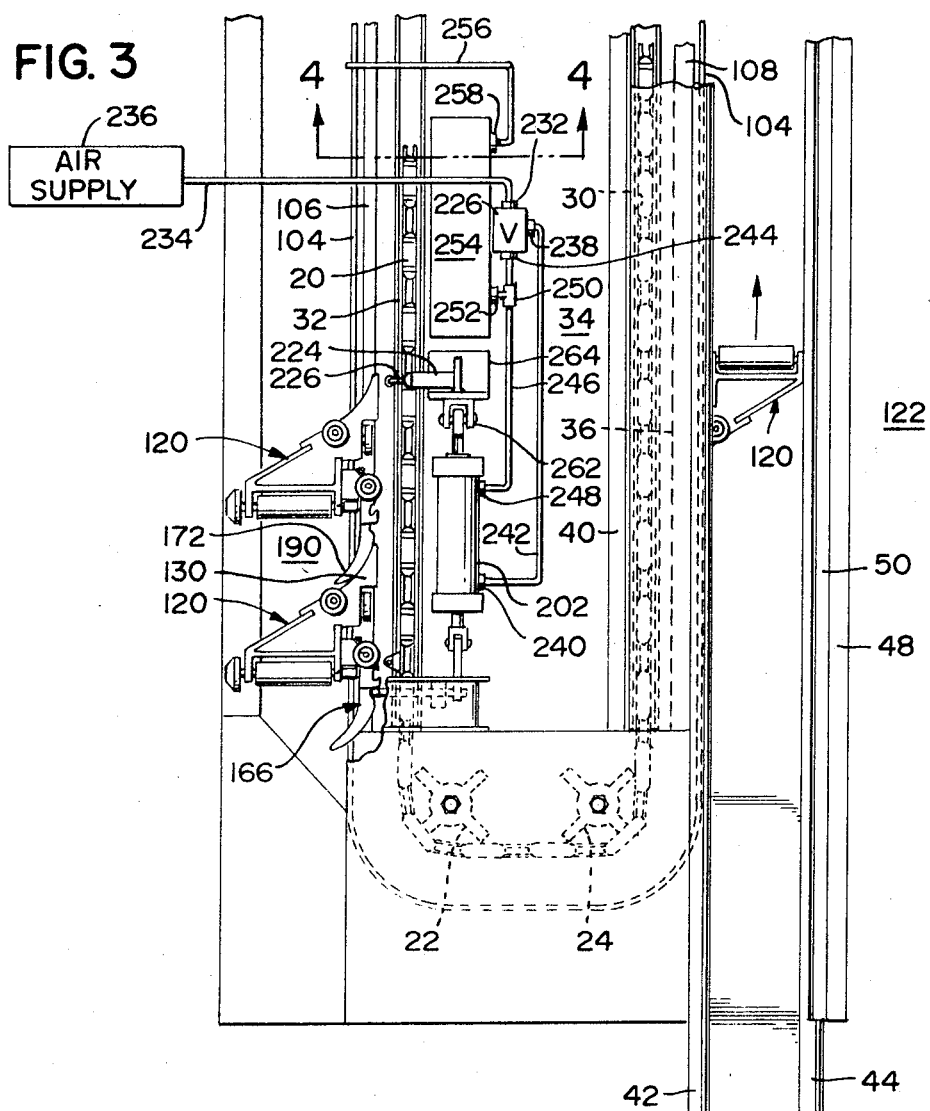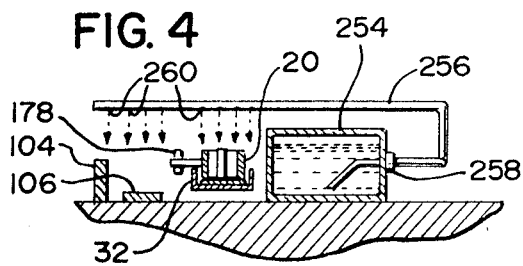

INVENTOR,
Donald A. Bernardi
BY
Brenner, O'Brien & Gray
ATTORNEYS

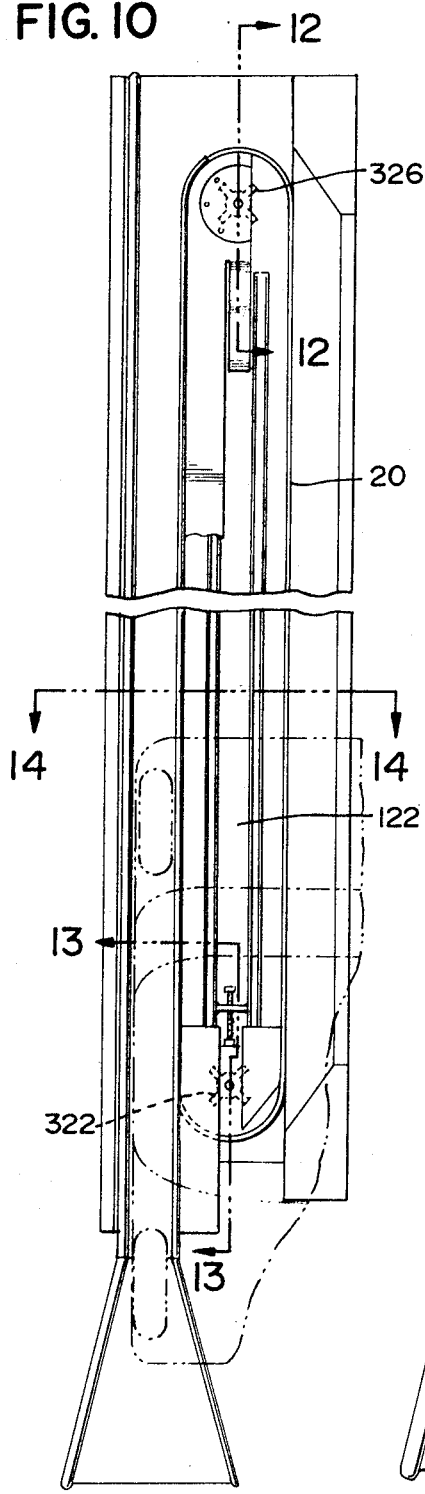
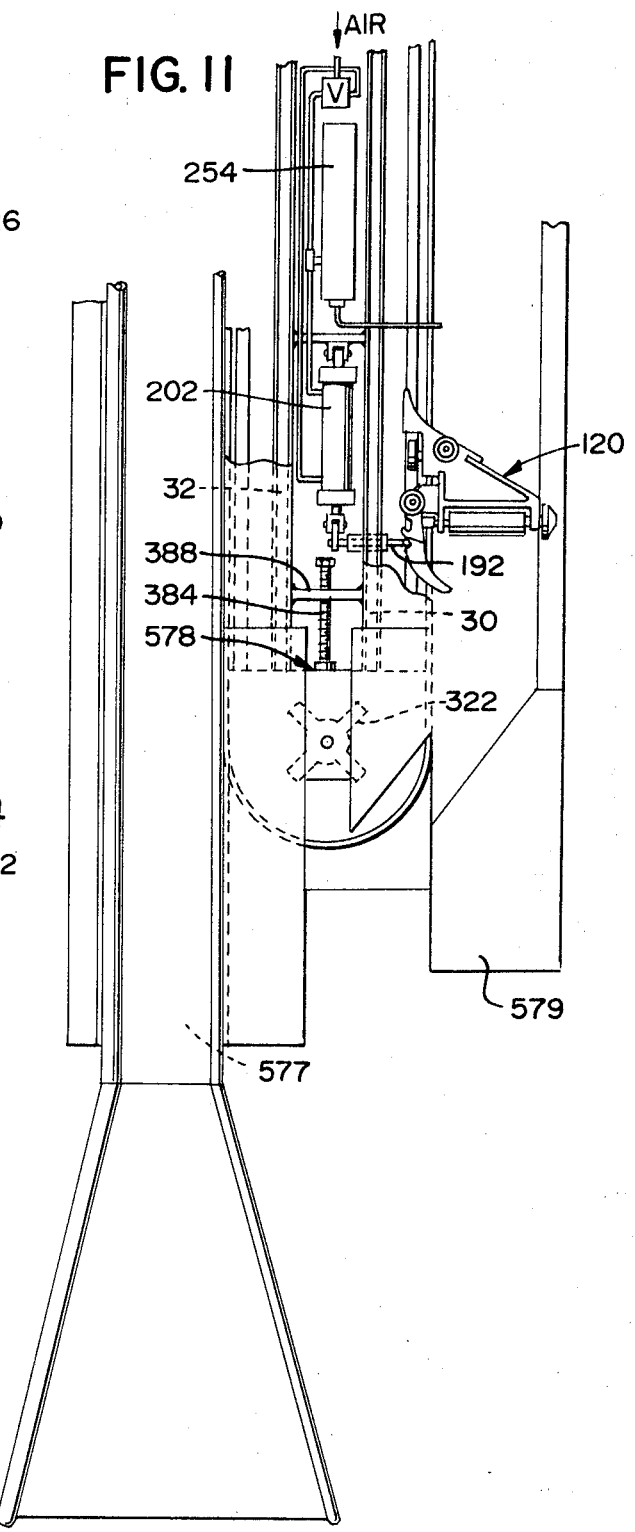

INVENTOR,
Donald A. Bernardi
BY
Brenner, O'Brien & Guay
ATTORNEYS

APPARATUS FOR MOVING A VEHICLE ALONG A PATH OF TRAVEL

BACKGROUND OF THE INVENTION

1. Field of the Invention

The present invention relates to conveyor apparatus and more particularly to apparatus for moving a vehicle along a predetermined path of travel.

2. Description of the Prior Art

In numerous applications, it is desired to move a vehicle from one point to another along a particular path of travel without relying on the motive power of the vehicle itself. For example, a number of vehicle washing facilities utilize conveyor assemblies to move the vehicles past various washing, rinsing, and the like stations at a constant rate independently of driver control. Conveyors of this general type have conventionally taken the form of a heavy drive chain which runs the length of the wash unit and to which the vehicles are manually attached by hooks. The disadvantages of such systems are apparent; namely, frequent vehicle damage and accidental operator injury.

Automated conveyors, exemplified by U. S. Pat. Nos. 3,196,806 and 3,233,551, which mechanically engage a wheel of each incoming vehicle, have proven satisfactory in overcoming these disadvantages but have exhibited other drawbacks which often make them undesirable in practice. For example, prior art automated conveyors are generally complex and costly, typically require the formation of unusual shaped pits in the floor of the wash facility to accommodate drive and return machinery, often obstruct the path of low-slung vehicles causing damage thereto, and are not readily accessible for routine maintenance.

SUMMARY OF THE INVENTION

The present invention is summarized in apparatus for moving a wheeled vehicle across a ground-level transport surface bounded by the paths of travel of the wheels of the vehicle including an endless drive chain constrained for movement in a horizontal plane upon a ground-level support surface adjacent the transport surface, a roller assembly operatively coupled with the endless drive chain for movement thereby from the support surface onto the transport surface to engage a wheel of the vehicle for moving the same across the transport surface, and a drive motor mounted upon the support surface and connected with the endless drive chain for applying motive power thereto whereby the vehicle moving apparatus may be mounted entirely above ground.

It is an object of the present invention to construct a vehicle conveyor which is mountable entirely above ground.

Another object of this invention is to mount apparatus for moving a vehicle outside the path of travel of such vehicle.

The present invention has another object in that a roller for engaging and pushing a vehicle along a path of travel is supported upon a segmented dual track having staggered, overlapping ends for load transfer regardless of track spacing.

A further object of this invention is to automatically lubricate the driving mechanism in a vehicle conveyor each time a vehicle is moved thereby.

A still further object of the present invention is to move a vehicle along an unobstructed path of travel by means of a horizontally disposed drive chain which is constrained about a sprocket wheel directly driven by a hydraulic motor.

The present invention has another object in the construction of a vehicle conveyor which is readily accessible for maintenance.

Another object of this invention is to construct a vehicle conveyor having a unitary slack take-up and drive assembly at one end thereof.

Other objects and advantages of the present invention will become apparent from the following description of the preferred embodiments when taken in conjunction with the accompanying drawings.

BRIEF DESCRIPTION OF THE DRAWINGS

FIG. 3 is a plan view of a detail of the entrance end of the apparatus of FIG. 1;

FIG. 4 is a sectional view taken along line 4—4 of FIG. 3;

FIG. 10 is a plan view of a modification of the apparatus of FIG. 1 according to the present invention with certain parts removed for clarity;

FIG. 11 is a plan view of a detail of the entrance end of the apparatus of FIG. 10;

DESCRIPTION OF THE PREFERRED EMBODIMENTS

Figure 6:
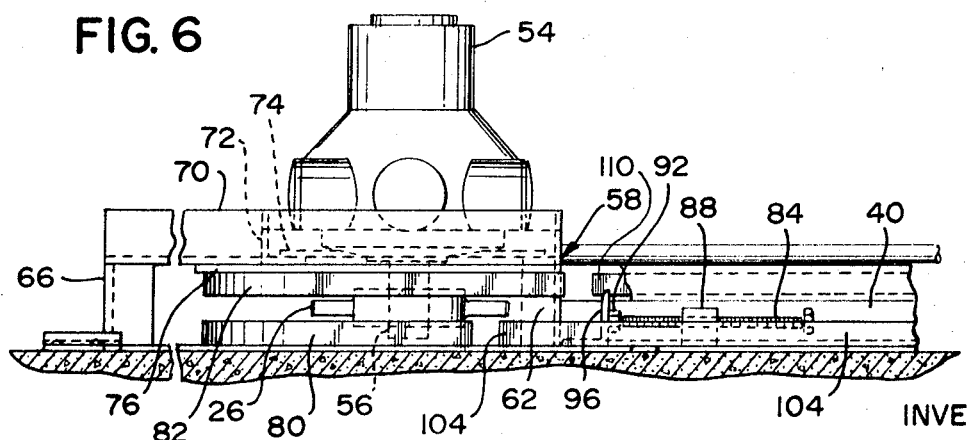
FIG. 6 is an elevational view taken along line 6—6 of FIG. 5.
Figure 7:
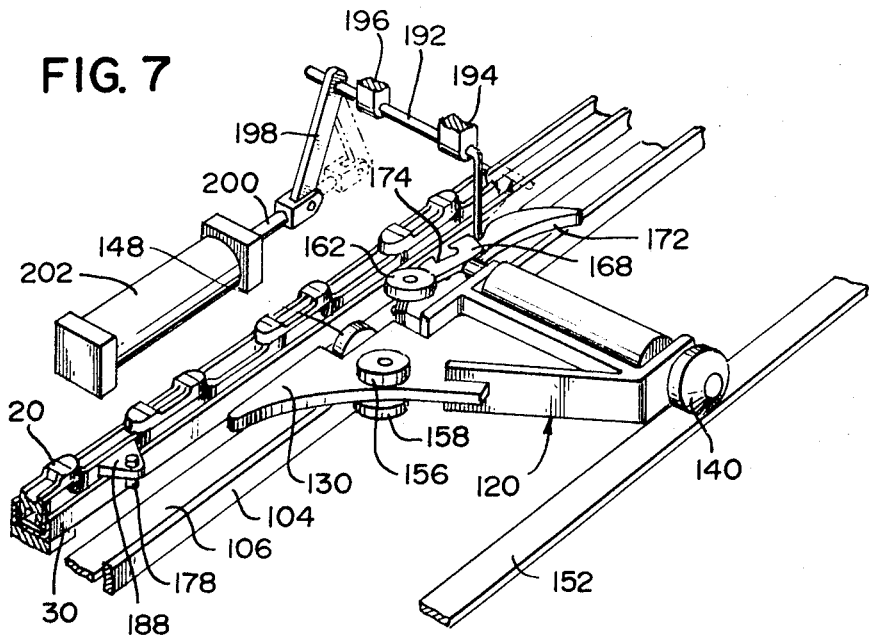
FIG. 7 is a diagrammatic view in perspective of the push roller releasing assembly of the apparatus of FIGS. 1 and 3.
Figure 8:
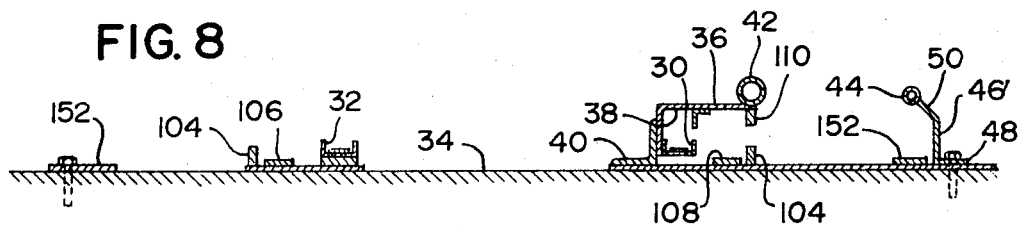
FIG. 8 is a sectional view taken along line 8—8 of FIG. 1.

Referring to FIGS. 1-9, there is illustrated a preferred embodiment of a vehicle conveyor apparatus according to the present invention including a drive chain 20 which is connected at its ends to form a closed loop. Chain 20 is constrained in a horizontal plane about a first pair of laterally aligned sprocket wheels 22 and 24 journalled for rotation at the entrance end of the apparatus and a second pair of laterally aligned sprocket wheels 26 and 28 journalled for rotation at the exit. The chain 20 is supported upon first and second spaced parallel channels 30 and 32 which are generally U-shaped in cross section and are mounted upon the surface of the ground on floor 34 as shown in FIG. 8. A flat cover plate 36 extends over channel 30 and has formed on a bottom surface thereof another U-shaped channel 38 for chain 20, with channels 30 and 38 and plate 36 supported on the ground by any suitable means such as a length of angle iron 40.

Figure 1:
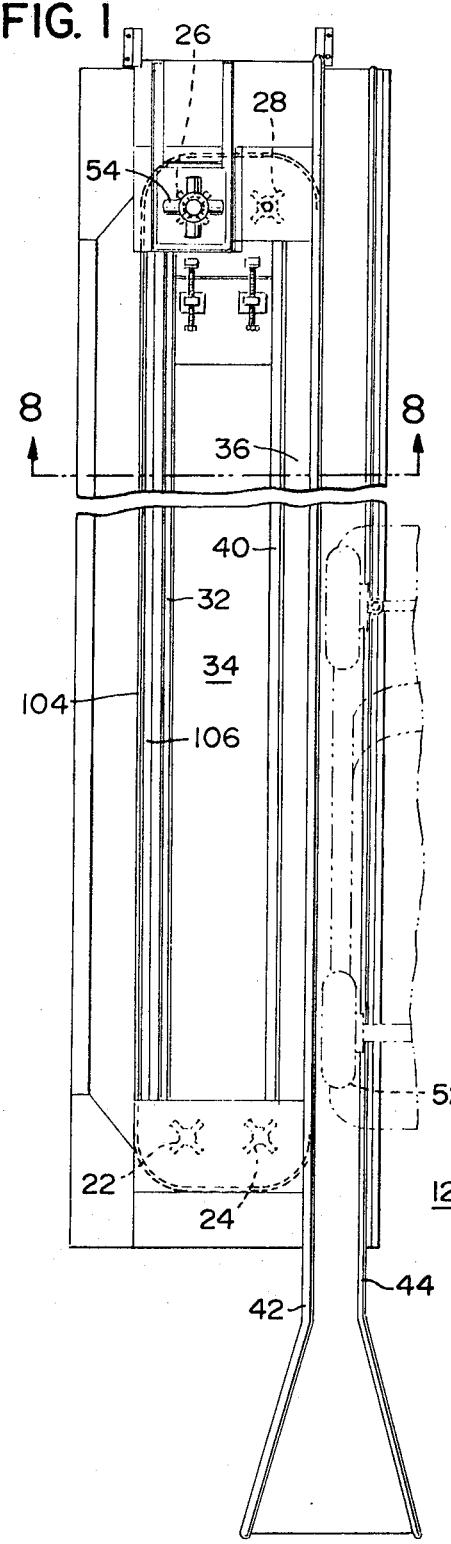
FIG. 1 is a plan view of a preferred embodiment of conveyor apparatus according to the present invention with certain parts removed for clarity.

A first guide rail 42 is affixed atop the distal edge of plate 36 as by welding and extends along the entire length of the conveyor apparatus as can be seen in FIGS. 1 and 8. Rail 42 cooperates with a second guide rail 44 which is mounted in parallel with rail 42 atop a vertical support wall 46 which has a flange 48 formed along its lower edge, and an oblique portion 50 formed along its upper edge and to which rail 44 is suitably attached as by welding. Wall 46 is attached to the ground at flange 48 by bolts or any other suitable fastener. Guide rails 42 and 44 are obliquely disposed at the entrance end of the apparatus so as to form an inwardly converging guide path for the left wheels of a vehicle, one such wheel being shown in phantom at 52 for purposes of illustration.

A hydraulic motor 54 is mounted in superposition with sprocket wheel 26 and has its output shaft 56 directly connected with the sprocket wheel for imparting rotary motion thereto so as to drive the chain 20 in a counterclockwise direction as visualized in FIG. 1. The motor 54 and sprocket wheels 26 and 28 are mounted above the ground upon a carriage assembly indicated generally at 58 in FIG. 6.

Figure 5:
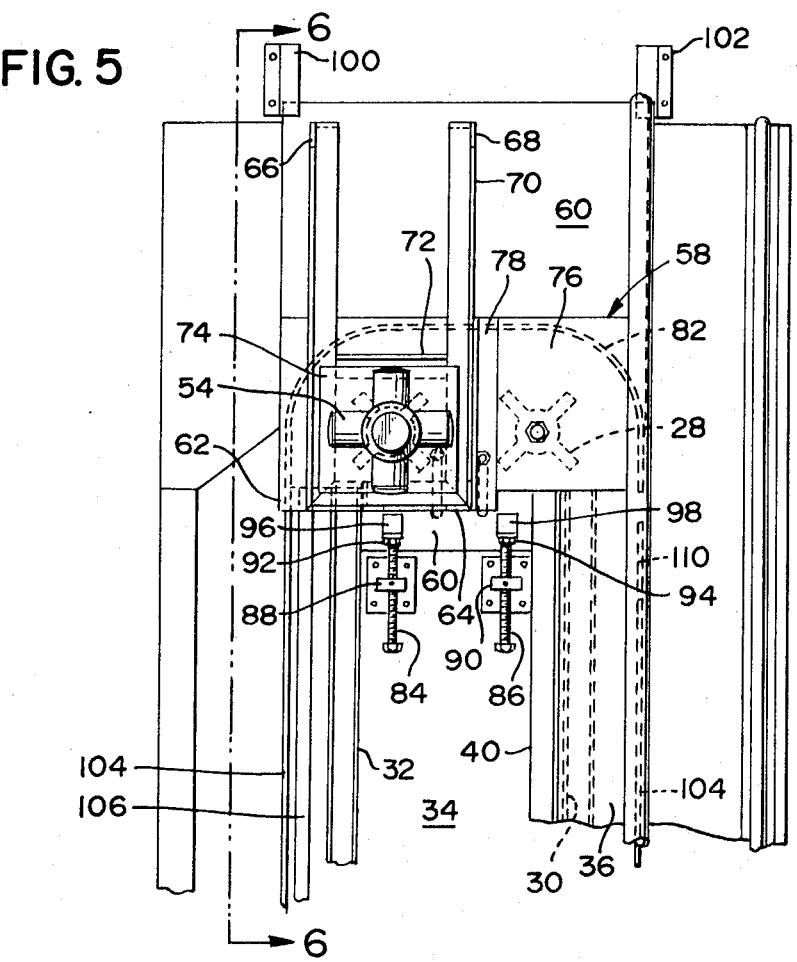
FIG. 5 is a plan view of a detail of the exit end of the apparatus of FIG. 1.

Carriage assembly 58 is movable along the ground with respect to its distance from sprocket wheels 22 and 24 so as to enable adjustment of the equipment to take up any slack which may develop in the chain with wear. The carriage assembly includes a flat bottom plate 60 which is slidably disposed on the ground 34 and upon which is welded four upstanding angle irons 62, 64, 66, 68 at the corners of an imaginary rectangle. The upper ends of angle irons 62-68 are secured, as by welding, to the corners of a horizontally disposed, generally U-shaped support frame 70 which is formed as shown in FIG. 5, of suitable angle irons. A short length of angle iron 72 is welded between the legs of frame 70 to form a closed square therewith. A square, flat mounting plate 74 for motor 54 is affixed atop support frame 70 and angle iron 72 and defines suitable apertures for accommodating the motor shaft 56 as well as the mounting bolts (not shown) for the motor. A cover plate 76 for sprocket wheels 26 and 28 is mounted under U-shaped frame 70 and is welded or otherwise fixedly secured thereto. A longitudinally disposed angle iron 78 is welded to both the cover plate 76 and one leg member of frame 70 to provide additional support for the cover plate.

An elongated metal bar having a rectangular cross-section is bent to define a generally U-shaped lower track section 80 which is affixed to plate 60 as by welding. A similar U-shaped track section 82 is welded to the underside of cover plate 76 in superposition with track 80, with the ends of track 82 extending slightly beyond the ends of track 80 in staggered relationship as viewed in FIG. 6.

A pair of relatively large adjusting bolts 84 and 86 are journalled through a respective one of a pair of self-locking supports 88 and 90 which are affixed in any suitable manner to the ground 34 for holding bolts 84 and 86 in substantially parallel alignment with each other and with the surface of the ground 34. A pair of bearings 92 and 94 are mounted upon a respective one of angle irons 96 and 98 which are suitably attached, as by welding, to plate 60 of carriage assembly 58. Bearings 92 and 94 are disposed to receive the ends of bolts 84 and 86, respectively, such that as the bolts are turned, the carriage assembly is moved along the ground 34 whereupon any slack which might develop in chain 20 can be readily taken-up.

A pair of rectangular plates 100 and 102 are longitudinally offset so as to provide a guide slot or channel for plate 60 of carriage assembly 58 and are mounted onto the floor 34 on either side of plate 60 to prevent lateral movement thereof while enabling free longitudinal adjustment of the carriage 58.

An elongated bar having a rectangular cross-section is bent to form a relatively large U-shaped main track 104 which is fixedly attached to the ground and extends throughout the length of the conveyor apparatus. Track 104 cooperates with track 80 of carriage assembly 58 to form a closed path upon which a plurality of push rollers, to be described below, are movably supported. A pair of elongated flat plates 106 and 108 are fixedly disposed adjacent track 104 and provide further support for the push rollers which ride thereon. It is noted that track 104 and plates 106 and 108 may be constructed in unitary fashion from suitable angle iron if so desired. Another track 110 is mounted to the undersurface of plate 36 (FIG. 8) in superposition with track 104 and cooperates with track 82 of carriage assembly 58 to provide a second support surface for the push rollers along the drive side or tire-engaging side of the conveyor, visualized to the right in FIG. 1.

As can be seen in FIGS. 5 and 6, lower tracks 80 and 104 form a complete loop while upper tracks 82 and 110 extend from the entrance end of the apparatus to the exit end thereof only on the drive side. It is important to note that the ends of upper track 82 overlap the ends of lower main tack 104, and similarly, the end of lower track 80 (on the drive side) overlaps the drive side exit end of upper track 110 such that the gaps formed between the main or fixed tracks 104 and 110 and the movable, carriage mounted tracks 80 and 82, with adjustment, are staggered. As will be more fully described below, the staggered relationship of the ends of the tracks provide complete support for the various push rollers so as to preclude malfunction regardless of the degree of slack take-up adjustment made to the carriage assembly 58.

Figure 2:
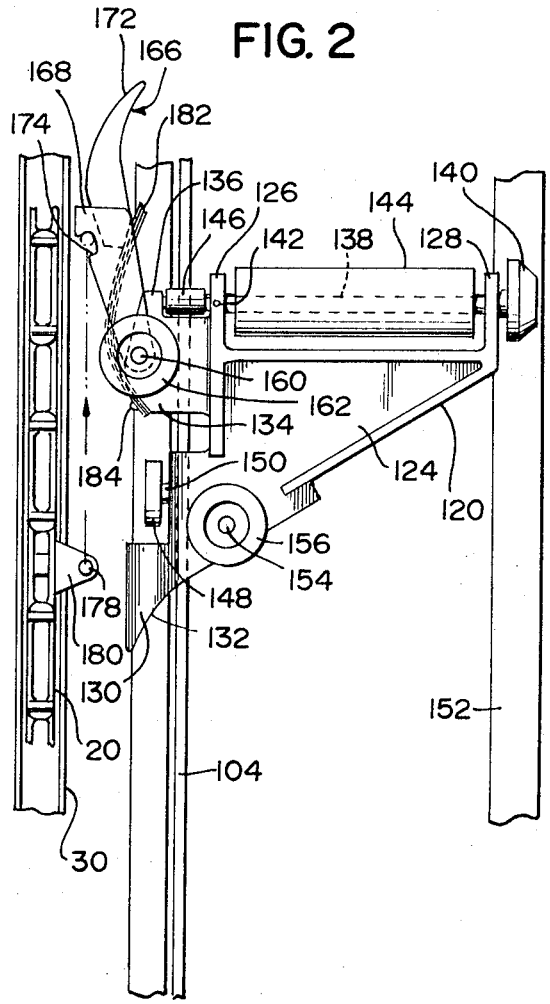
FIG. 2 is a plan view of a detail of one of a plurality of vehicle push rollers used with the apparatus of FIG. 1.

As shown in FIGS. 2, 3, and 7, a plurality of identical push rollers, each indicated generally at 120, are disposed for movement upon tracks 80 and 104 and tracks 82 and 110. Roller assemblies 120 are designed to engage the left rear wheel of a vehicle for moving the same over a transport surface 122 which is adjacent the support surface 34 for the conveyor apparatus. Each push roller 120 includes a triangular main body portion 124 having two spaced forwardly projecting parallel arms 126 and 128 and a rearwardly projecting leg 130 which has an arcuate rear edge 132. An arm 134 protrudes laterally from main body portion 124 and has a forwardly projecting lip 136 as viewed in FIG. 2. A shaft 138 having a wheel 140 rotatably attached at one end extends through arms 126 and 128 and into a suitable lateral aperture defined by lip 136. Shaft 138 is captured onto the main body portion 124 by any suitable means such as a pin 142 inserted through arm 126 and into the shaft perpendicular to its axis. A cylindrical roller 144 is journalled for rotation on shaft 138 and is constrained in the position illustrated in FIG. 2 by arms 126 and 128. The roller 144 may be constructed of any suitable material such as nylon, plastic, metal, or the like.

A small roller wheel 146 is also journalled for rotation on shaft 138 and is disposed between arm 126 and lip 136 of arm 134. Another wheel 148 is rotatably disposed upon a shaft 150 which extends laterally from the rearward end of main body portion 124. Thus, the push roller assembly 120 is supported in front upon wheel 146 (which rides upon the upper edge of tracks 104 and 80) and wheel 140 (which rides on the ground or on a suitable flat rail 152) and is supported in back upon wheel 148 (which rides on the support rails 106 and 108).

A vertical shaft 154 extends through main body portion 124 and has a pair of identical wheels 156 and 158 rotatably mounted thereon, one above and the other below main body portion 124. Likewise, another vertical shaft 160 extends through arm 134 and has a pair of identical wheels 162 and 164 mounted for rotation thereon, one above and the other below arm 134. When the push roller assembly is mounted in its operative position with respect to the conveyor apparatus, wheels 156 and 158 ride on the outer vertical surfaces of the upper and lower tracks, respectively, and wheels 162 and 164 ride on the inner vertical surfaces thereof, as can be seen in FIG. 2.

A coupling assembly, indicated generally at 166, includes a pair of identical, generally triangular plates 168 and 170 which are welded at their front ends to the upper and lower edges of an arcuate camming member 172 and are journalled at their rear ends for rotation on shaft 160. The plates 168 and 170 are disposed adjacent the top and bottom surfaces, respectively, of arm 134 between the arm 134 and a respective one of the wheels 162 and 164. Plates 168 and 170 define notches 174 and 176, respectively, which are selectively engaged by one of a plurality of vertical pins 178 each affixed within an aperture defined in the distal end of one of a spaced plurality of outwardly protruding links 180 of chain 20. Coupling assembly 166 is biased to a counterclockwise rotated position, as viewed in FIG. 2, by a plurality of stacked leaf springs 182 which are secured at their proximal ends to the inner side of arm 134 as by a bolt 184 threadedly secured therein.

As shown in FIG. 3, the push rollers 120 are stored or parked at a terminal station 190 from which they are drawn one-by-one as needed. The first, or lowermost, roller assembly 120, as viewed in FIG. 3, is held in its parked position by apparatus to be described below such that coupling assembly 166 thereof is rotated clockwise to a disengaged position away from the chain 20. The next roller assembly is likewise disengaged by the cooperative interaction of its camming member 172 and the curved edge 132 of leg 130 of the first roller assembly 120. The desired number of rollers are thus held parked until needed.

The holding assembly for the first push roller 120 at terminal station 190 is illustrated diagrammatically in FIG. 7 and includes an L-shaped holding rod 192 having a horizontal leg which is journalled for rotation in a pair of support bearings 194 and 196. Rod 192 also includes a vertical leg which is disposed for movement through a 90 degree arc in a vertical plane parallel with and slightly spaced from the path of travel of chain 20. Rigidly secured onto the end of th horizontal leg of rod 192 is a downwardly directed link member 198 which is pivotally attached at its bottom end with a piston shaft 200 of a pneumatic cylinder 202. Thus, when piston shaft 200 is retracted within the cylinder, the vertical leg of rod 192 is held in the position illustrated in FIG. 7 so as to protrude downwardly into the path of camming member 172 of roller assembly 120. As the camming member engages rod 192, the coupling assembly 166 is rotated clockwise such that plates 168 are moved away from the chain and become disengaged from pin 178. The roller assembly is thus held in a parked position against rod 192. To release the roller assembly, the piston shaft 200 is caused to extend from the cylinder 202 such that the vertical leg of rod 192 swings upwardly out of the coupling assembly path. As a result, the coupling assembly 166 rotates counterclockwise under the force of springs 182 and is engaged at notches 174 and 176 by pin 178 of chain 20 as it moves past the roller assembly.

Figure 9:
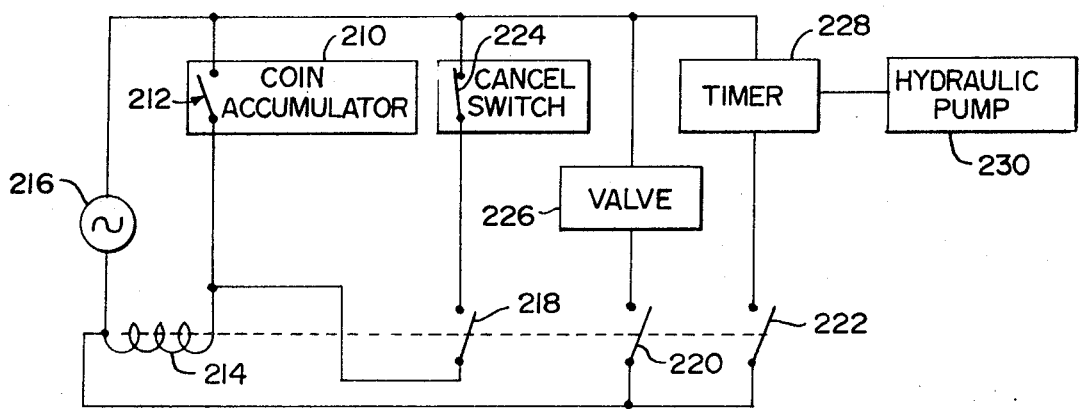
FIG. 9 is a schematic diagram in block form of the control circuitry of the apparatus of FIG. 1.

Referring to FIG. 9, the control network for operating cylinder 202 and the rest of the vehicle conveyor apparatus includes a coin accumulator 210 having a pair of normally-open contacts 212 which are wired in series with a relay coil 214 across a source of operating potential 216. Accumulator 210 may be of any suitable type in which contacts 212 become momentarily closed upon the insertion of a predetermined amount of money into the accumulator. Relay coil 214 controls three sets of normally-open contacts 218, 220, and 222. When contacts 212 of accumulator 210 become closed, power is fed from source 216 to relay coil 214 so as to energize the coil and close contacts 218, 220, 222. Contacts 218 are wired in series with a normally-closed cancel switch 224, with the series network connected in parallel with accumulator contacts 212 so as to provide a locking or holding circuit for relay coil 214. Contacts 220 are connected in series with an electrically operated air valve 226 across power source 216, and contacts 222 are connected in series with a timing network 228 across the power source. Timing network 228 energizes a hydraulic pump 230 so as to actuate hydraulic motor 54 for a time interval sufficient to move one vehicle across the apparatus.

Referring to FIG. 3, valve 226 has an inlet port 232 connected via pressure line 234 to a source of pressurized air 236, and has a normally-open outlet port 238 connected to a first port 240 of cylinder 202 by a line 242. A normally-closed port 224 of valve 226 is connected via line 246 to a second port 248 of cylinder 202 and is also connected by a T-fitting 250 to a pressure inlet port 252 of a lubricant holding tank 254. A hollow tube 256 (FIG. 4) extends from the interior of tank 254 through a suitable seal 258 and is self-supported in cantilever fashion over the path of travel of chain 20 and at least the wheels 162 and 164 of roller assemblies 120. The tube is sealed at its distal end and defines a set of nozzles 260 along its bottom side, as shown in FIG. 4, for applying lubricant to the chain and roller assemblies 120.

As seen in FIG. 3, cylinder 202 is pivotally mounted at 262 to a support 264 which is attached to the ground 34. Support 264 also carries cancel switch 224 which is disposed such that an actuating arm 266 thereof extends into the path of wheel 162 of each of the push rollers 120. Arm 266 is adapted to be moved by wheel 162 as the roller assembly passes the cancel switch whereupon the contacts 224 will be momentarily opened.

It should be noted, at this point, that all of the assemblies and subassemblies of the conveyor apparatus of FIGS. 1–9 are mounted above the ground on support surface 34 which is preferably to the left of and adjacent the transport surface 122 over which a vehicle is to be moved. Thus, all of the apparatus is disposed outside of the path of travel of the vehicle and there is no need to form any pits or recesses in the ground to accommodate the equipment. This results in a substantial savings in cost and installation time. Furthermore, since all equipment is mounted above-ground, it is readily accessible for routine maintenance and repair at further savings.

The operation of the conveyor apparatus according to the present invention will be described in connection with its use in a vehicle washing installation merely for purposes of illustration, it being understood that numerous other applications are contemplated with equal efficacy.

In operation, initially all of the push rollers 120 will be parked at the terminal or storage area 190. Valve 226 (FIGS. 3 and 9) will be deenergized so that pressurized air from supply 236 is fed through lines 234 and 242 to inlet port of cylinder 202. As a result, piston shaft 200 will be withdrawn into the cylinder such that the vertical leg of rod 192 is swung down into the path of the coupling assembly of the next-to-be-used roller assembly 120 to hold the same disengaged from chain 20.

A vehicle may then be driven onto the conveyor with its left wheels guided beteween rails 42 and 44 until it reaches the position shown in FIG. 1. At this point, a predetermined amount of money is deposited into the coin accumulator 210, which is disposed within reach of the vehicle driver. When the accumulator is satisfied, contacts 212 thereof will become momentarily closed to establish an energization path for relay coil 214. Referring to FIG. 9, when relay coil 214 is energized, contacts 218 will be closed whereby a closed path through cancel switch 224 is established for holding relay coil 214 energized after contacts 212 open. Coil 214 also causes the closure of contacts 220 and 222 so as to enable energization of valve 226 and timer network 228. With valve 226 energized, air from source 236 will be fed from line 234 to line 246 and thence to port 248 of air cylinder 202. This causes piston shaft 200 to be extended out of the cylinder so as to rotate rod 192 and release the coupling assembly 166 of the first push roller.

Referring to FIG. 2, when coupling assembly 166 is released, it will rotate counterclockwise under the force of springs 182 so as to move toward chain 20. Notches 174 and 176 will then be in a position to be picked up by pin 178 of chain 20 as the chain begins to move. At this same time, the actuation of timer 228 causes hydraulic pump 230 to begin operation for starting the hydraulic drive motor 54. The timer will maintain the pump operating until a sufficient time interval has elapsed for complete movement of the vehicle through the washing installation.

With the chain 20 moving counterclockwise, as viewed in FIG. 1, and with the first roller assembly 120 released by the action of cylinder 202, the first push roller will be picked up by pin 178 and will be moved around the entrance end of the apparatus from the support surface 34 onto the transport surface 122 to engage the rear wheel of the vehicle. Continued movement of the push roller 120 along the drive side of the apparatus will move the vehicle over transport surface 122 with roller 144 in contact with the left rear wheel thereof. It is noted that wheels 140 and 146 of the push rollers 120 support roller 144 above the ground so that it may freely rotate in the reverse direction as the vehicle is transported along the length of the conveyor. In addition, the oblique portion 50 of wall 46 supports rail 44 in a shielding position for wheel 140 of each push roller whereby the vehicle tires are prevented from rubbing against wheel 140 and becoming damaged.

When valve 226 was initially energized to remove air pressure from port 240 of cylinder 202 and apply air pressure to port 248 thereof, the air pressure signal fed to port 248 was also fed through T-fitting 250 to port 252 of lubricant tank 254. With the tank pressurized, lubricant contained therein is forced into tube 256 from which it is sprayed onto chain 20 and the roller assemblies 120 by nozzles 260 (FIG. 4). This spraying or lubricating action continues until the air pressure is released from tank 254 as will be described below.

After the first roller assembly is moved out of the terminal area 190, leg 130 will have moved away from the coupling assembly 166 of the next adjacent push roller 120 to permit the coupling assembly to rotate to its chain engaging position. Thus, the next pin 178 of chain 20 will engage the second roller assembly and move it forward until it is released or disengaged by the action of rod 192 and cylinder 202, to be described below. Likewise, when the last-mentioned push roller moves forward, the roller assembly following it will be released for engagement by the chain and will be similarly moved forward until its camming member 172 contacts the leg 130 of the roller assembly in front of it for disengagement. All of the stored or parked roller assemblies will be moved forward in this manner each time a roller assembly leaves the terminal area 190 for engaging a vehicle.

As shown in FIG. 3, arm 266 of cancel switch 224 is disposed in the path of wheel 162 of each roller assembly 120 such that whenever a roller assembly passes thereby, as a result of the above sequence of operation, arm 266 will be moved by wheel 162 so as to momentarily open cancel switch 224 (FIG. 9). When cancel switch 224 opens, the energization path from power source 216 to relay coil 214 is interrupted causing relay switches 218, 220, and 222 to drop-out or open. As a result, valve 226 is deenergized to remove air pressure from port 248 of cylinder 202 and tank 254 and reapply pressure to port 240 of the pneumatic cylinder. The lubricant tank is thus de-pressurized such that the spray of lubricant from nozzles 260 ceases. Also piston shaft 200 is withdrawn to once again rotate rod 192 to a point where the oncoming roller assembly 120 is disengaged from the chain and held parked for subsequent use. It is noted that timer 228 maintains pump 230 operating after relay coil is deenergized for a preset interval during which the active roller assembly is returned to the storage area.

Thus, it can be appreciated that after a vehicle enters the conveyor apparatus and the driver deposits the required amount of money into the accumulator 210, the chain 20 begins to move, a push roller 120 is released for engagement by the chain and a predetermined amount of lubricant is applied to the chain and roller assemblies. Thereafter, once the remaining stored roller assemblies 120 move up and trip the cancel switch 224, the next roller assembly will be held parked and the flow of lubricant terminated. Therefore, each time a vehicle enters and actuates the apparatus, one roller assembly will be released and a preselected amount of lubricant will be automatically applied to the equipment.

As the released push roller engages the vehicle and moves it along the apparatus, wheels 156 and 162 and wheels 158 and 164 thereof will transmit the load forces to load-bearing tracks 110 and 104, respectively. When the push roller reaches the exit end of the conveyor, the push roller will ride off tracks 110 and 104 and onto U-shaped tracks 82 and 80 of carriage assembly 58 (FIG. 6). Since the upper tracks 82 and 110 meet at a point which is spaced or staggered from the point at which lower tracks λ and 104 80 the loads applied through the push rollers are received by at least one track at all times regardless of the gaps between the tracks and thus independent of the adjusted spacing of carriage assembly 58 with respect to the idler sprocker wheels 22 and 24. In this manner, the carriage assembly 58 may be adjusted to take up any slack which may develop in chain 20 with wear without affecting the operation of the roller assemblies as they are moved from the end of the drive path of travel, around the carriage assembly and back along the return path of travel to the storage area 190.

It can be appreciated that each roller assembly, in operation, makes a complete trip from the storage area 190, around the entrance end of the conveyor and onto the transport surface 122 for the vehicle, along the drive path of travel, around the exit end of the conveyor and along the return path outside of the vehicle path back to the storage area. Thus, each roller assembly is returned outside of the path of travel of the vehicle so as not to obstruct or damage the same, as was often the case in the past.

A modification of the apparatus of FIGS. 1-9 is illustrated in FIGS. 10-14. Parts identical to parts in FIGS. 1-9 are identically numbered and will not be described again for the sake of brevity, while those parts which are similar will be identified by similar numerals with 300 added thereto.

As illustrated in FIG. 10, chain 20 is constrained in a horizontal plane about a pair of spaced sprocket wheels 322 and 326 which are journalled for rotation at the entrance and exit ends, respectively, of the conveyor apparatus. Only a single sprocket wheel is used at each end and the entire apparatus is disposed on the transport surface 122 such that a vehicle is moved over the apparatus as it traverses its path of travel. Thus, the modification of FIGS. 10-14 may be termed an "inboard" system, as opposed to the "outboard" system of FIGS. 1-9, with all of the equipment mounted above the ground at a low profile so as to preclude obstructing or damaging the vehicles as they pass along the length of the conveyor.

Figure 12:
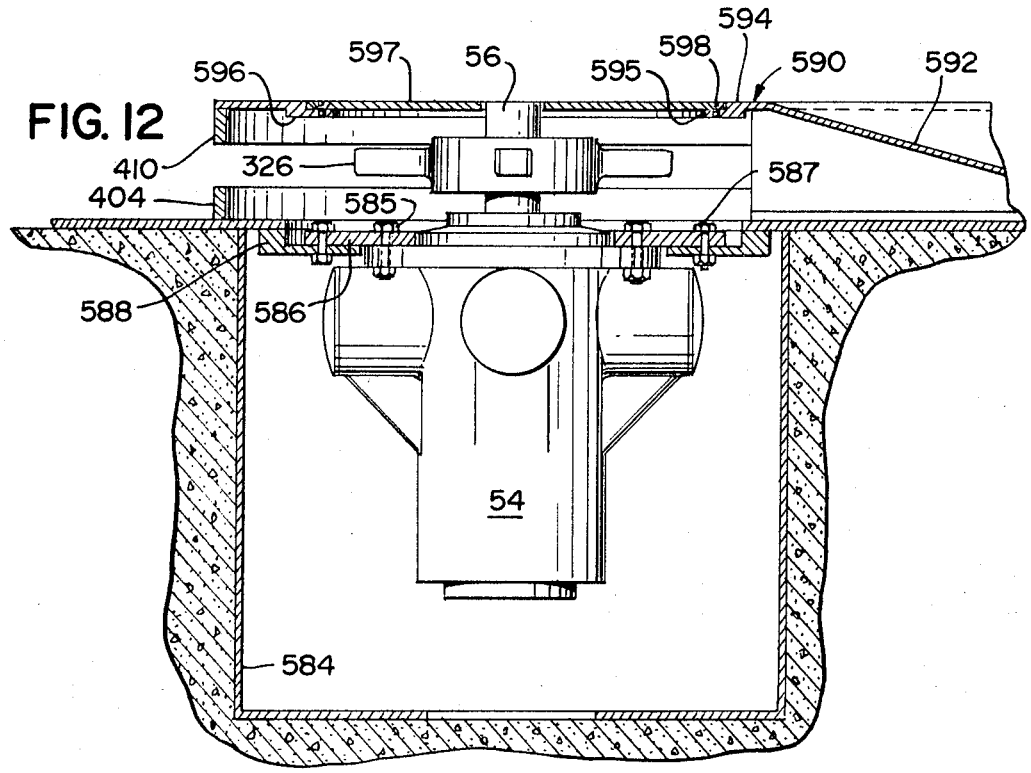
FIG. 12 is an elevational view, partially in section, taken along line 12—12 of FIG. 10.
Figure 13:
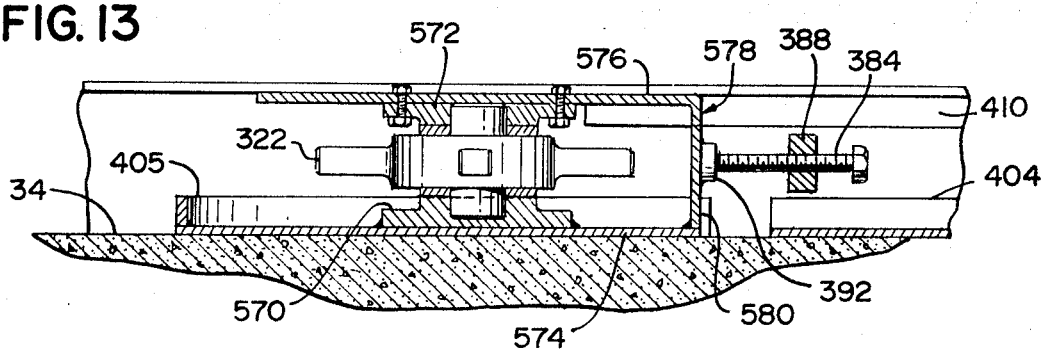
FIG. 13 is an elevational view, partially in section, taken along line 13—13 of FIG. 10.
Figure 14:
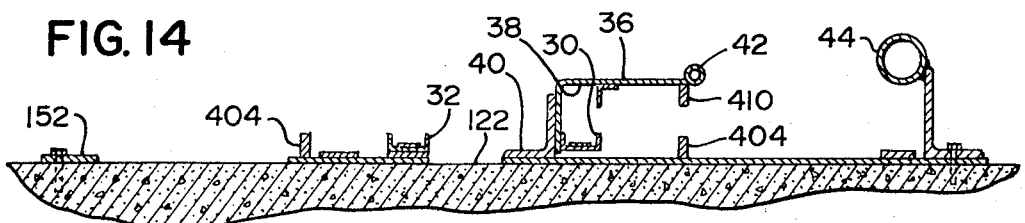
FIG. 14 is a sectional view taken along line 14—14 of FIG. 10.

Referring to FIGS. 11 and 13, it can be appreciated that the control equipment including L-shaped rod 192, cylinder 202, lubricant tank 254, etc. as previously described, is identical in the modification of FIGS. 10-14 and thus will not be described again. It is noted, however, that the entrance end of the modified conveyor differs in that the chain slack take-up mechanism is located at the entrance end of the conveyor rather than at the exit end as in the preceeding embodiment.

Sprocket wheel 322 is mounted for rotation between a pair of bearing assemblies 570 and 572 which are respectively affixed to the inner surfaces of a bottom plate 574 and a top or cover plate 576 of a movable carriage assembly 578. Carriage assembly 578 includes a vertical wall 580 which joins the top plate 576 with the bottom plate 574 at the rear edges thereof, as best seen in FIG. 13. An elongated rod having a horizontal section is bent to form a U-shaped track 405 which is affixed, as by welding, to bottom plate 574 of the carriage assembly. Track 405 cooperates with a fixed, main lower track 404 and a fixed, main upper track 410 for supporting the various push rollers 120. As in the embodiment of FIGS. 1-9, the ends of tracks 405 and 410 are staggered or overlapped (FIG. 13) so that the roller assemblies will be positively supported on at least one of the tracks at all times regardless of the degree of slack take-up.

Carriage assembly 578 is adjusted with respect to its distance from sprocket wheel 326 by a bolt 384 which is threadedly mounted in a self-locking support 388. Support 388 extends transversely across the apparatus and is welded or otherwise suitably affixed at both ends to guide channels 30 and 32 (FIG. 11). The end of bolt 384 is disposed within a closed bearing 392 such that as the bolt is turned, the carriage assembly moves to take-up any chain slack which might develop with wear. The carriage assembly 578 is prevented from lateral movement by plates 577 and 579 which are mounted on surface 122 on either side of plate 574.

As shown in FIG. 12, the drive end of the apparatus of FIG. 10 includes a hydraulic motor 54 which is mounted inverted in a recess 584 formed in the ground. The motor is attached by bolts 585 to a mounting plate 586 which, in turn, is attached by bolts 587 to a flange 588 suitably affixed to the ground about the periphery of recess 584. Sprocket wheel 326 is directly attached to drive shaft 56 of motor 54 for moving the drive chain 20. A cover assembly for the motor and sprocket wheel includes a plate 590 having an inclined portion 592 and a horizontal portion 594. Horizontal portion 594 of the cover defines an aperture 595 having offset flange 596 formed about the periphery. Aperture 595 is large enough to accomodate motor 54 so as to facilitate quick repair and maintenance and is adapted to be closed by a lid 597 which is secured as by flush mounting bolts 598.

The operation of the apparatus of FIGS. 10-14 is substantially identical with that of the embodiment of FIGS. 1-9 and thus will not be described again. It is important to note that in the embodiment of FIGS. 10-14, all of the equipment with the exception of motor 54 is mounted above the ground thereby facilitating installation. Furthermore, the motor may be easily removed for inspection or repair. Referring to FIG. 12, it can be seen that by simply removing bolts 598, lid 597 may be removed to provide access to sprocket wheel 326 and the top of motor 54 for inspection. If it is necessary to remove the motor, one need only remove bolts 597 and the entire motor-sprocket wheel assembly may be lifted from the recess 584.

Some of the numerous advantages exhibited by the vehicle conveyor apparatus according to the present invention over the prior art systems are that they are automatically self-lubricated in accordance with the amount of use made of the equipment, that staggered track ends effectively support the push rollers indepen-

What is claimed is:

1. Apparatus for moving a wheeled vehicle across a ground-level transport surface bounded by the paths of travel of the wheels of the vehicle comprising an endless drive chain constrained for movement in a horizontal plane upon a ground-level support surface adjacent the transport surface, means mounted upon said support surface and connected with said endless drive chain for applying motive power thereto whereby the vehicle moving apparatus may be mounted entirely above the ground, roller means including coupling means movable between a retracted position and a chain engaging position being operatively coupled with said endless drive chain for movement thereby from said support surface onto said transport surface to engage a wheel of the vehicle for moving the same across the transport surface, control means holding said coupling means in said retracted position and energizable to release the same to said chain engaging position, and lubricating means responsive to energization of said control means for applying lubricant to said drive chain.

2. The invention as recited in claim 1 wherein said motive power means comprises a hydraulic motor directly connected with said endless drive chain.

3. The invention as recited in claim 1 wherein said control means includes pneumatic release means adapted to selectively receive a supply of pressurized air and responsive thereto for releasing said coupling means to said chain engaging position, and wherein said lubricating means includes a closed lubricant holding tank having inlet means adapted to receive said supply of pressurized air and having outlet means disposed adjacent said drive chain for applying lubricant thereto upon pressurization of said holding tank.

4. The invention as recited in claim 3 wherein said outlet means of said lubricating means is disposed in superposition with said drive chain for applying lubricant to both said drive chain and said roller means.

5. The invention as recited in claim 1 wherein said roller means includes a push roller journalled for rotation about a horizontal axis for directly engaging a wheel of the vehicle, and a roller wheel for supporting said push roller in spaced relation with said support surface for movement therealong, and further including guide means for the wheel of the vehicle disposed above said roller wheel to shield the same from contact with the wheel of the vehicle.

6. Apparatus for moving a wheeled vehicle over a preselected path of travel comprising a drive chain connected at its ends to form an endless loop, guide means for said endless drive chain mounted in a horizontal plane upon a ground-level support surface adjacent the preselected path of travel of the vehicle and guiding said endless drive chain along first and second spaced lines of travel, roller means operatively coupled with said endless drive chain for movement thereby from a terminal area, said roller means engaging a wheel of the vehicle as said endless drive chain moves along said first line of travel to move the vehicle along the preselected path of travel, said endless drive chain returning said roller means to said terminal area as said drive chain moves along said second line of travel, and drive means mounted upon said support surface and connected with said endless drive chain to move the same along said first and second lines of travel whereby the preselected path of travel of the vehicle is unobstructed by the vehicle moving apparatus, said guide means including first and second spaced track means cooperating to form a closed guide path for said roller means, said first and second track means having staggered, overlapping ends whereby said roller means is supported upon at least one of said first and second track means as it moves about said closed guide path.

7. The invention as recited in claim 6 wherein said roller means includes a plurality of roller assemblies, each of said roller assemblies including coupling means selectively engagable with said drive chain and a release arm cooperating with the coupling means of the following roller assembly to disengage said following roller assembly from said drive chain as said following roller assembly moves into contact therewith.

8. The invention as recited in claim 7 further including control means connected with said roller means and said drive means for simultaneously energizing said drive means and engaging the coupling means of one of said roller assemblies with said drive chain.

9. The invention as recited in claim 6 wherein said guide means comprises a plurality of spaced sprocket wheel disposed in a horizontal plane and constraining said drive chain for movement therearound and wherein said drive means comprises a hydraulic motor directly connected with one of said plurality of sprocket wheels.

10. The invention as recited in claim 6 wherein said second track means is disposed inboard of said first track means whereby the vehicle is moved over said second track means.

11. The invention as recited in claim 6 wherein said second track means is disposed outboard of said first track means whereby the vehicle is moved along side of said second track means.

12. Apparatus for moving vehicles along a preselected path of travel comprising an endless drive chain driven in a horizontal plane on spaced sprocket wheels, a plurality of roller means, each selectively engagable with said drive chain for pushing one of the vehicles along the preselected path of travel, each of said roller means including coupling means movable between a chain-engaging position and a retracted position, release means disposed adjacent said drive chain and sequentially cooperating with each one of said coupling means to hold said coupling means in its retracted position and energizable to release said coupling means to its chain-engaging position, lubricating means mounted adjacent said drive chain and energizable to apply a preselected amount of lubricant to said drive chain, and control means connected with said release means and said lubricating means and selectively operable to energize both said release means and said lubricating means whereby said preselected amount of lubricant is applied to said drive chain upon the release of each of said coupling means of said roller means.

13. The invention as recited in claim 12 wherein said lubricating means comprises a lubricant holding tank having inlet means adapted to be connected with a source of pressurized air by said control means and outlet means for applying lubricant to said drive chain whenever said control means supplies pressurized air from said source to said holding tank.

14. The invention as recited in claim 13 wherein said outlet means is disposed in superposition with said drive chain and said roller means for applying lubricant to said drive chain and said roller means.

15. The invention as recited in claim 12 further including guide means cooperating with said sprocket wheels for constraining said drive chain for movement along first and second substantially parallel, spaced lines of travel and wherein said release means and said lubricating means are mounted between said first and second lines of travel.

16. The invention as recited in claim 15 wherein said guide means is mounted adjacent the preselected path of travel of the vehicle such that said path of travel is unobstructed thereby.

17. In a vehicle conveyor assembly, the combination comprising, an endless drive chain driven in a horizontal plane on at least two spaced sprocket wheels, roller means operatively coupled with said endless drive chain for pushing a vehicle along a preselected path of travel, said roller means having first and second spaced load-bearing wheel means, guide means for said roller means and having at least one load-receiving track for cooperation with said first wheel means of said roller means, adjustment means for adjustably presetting the spacing between said sprocket wheels, said adjustment means including carriage means for one of said sprocket wheels and adjustable in said horizontal plane with respect to its distance from the other of said sprocket wheels, and said carriage means including another load-receiving track for said roller means cooperating with said second wheel means and further cooperating with said load-receiving track of said guide means to provide a closed guide path for said roller means, adjacent ends of said load-receiving tracks being disposed in staggered relationship therebetween whereby loads applied by said roller means are received by at least one of said load-receiving tracks regardless of the horizontal adjusted spacing between said guide means and said carriage means.

18. The invention as recited in claim 17 further including a hydraulic motor for said endless drive chain mounted upon said carriage means and directly connected with said one sprocket wheel for rotation thereof.

* * * * *